United States Patent [19]

Mizukami

[11] Patent Number: 5,024,903
[45] Date of Patent: Jun. 18, 1991

[54] MAGNETIC RECORDING MEDIUM HAVING A MAGNETIC LAYER OF A QUATERNARY ALLOY

[75] Inventor: Makoto Mizukami, Yokohama, Japan

[73] Assignee: Victor Company of Japan, Ltd., Japan

[21] Appl. No.: 331,790

[22] Filed: Apr. 3, 1989

[30] Foreign Application Priority Data

Apr. 4, 1988 [JP] Japan .................................. 63-82778

[51] Int. Cl.$^5$ ........................................... G11B 23/00
[52] U.S. Cl. .................... 428/694; 428/611; 428/668; 428/670; 428/678; 428/900
[58] Field of Search ............... 428/611, 668, 670, 694, 428/900, 678, 928

[56] References Cited

U.S. PATENT DOCUMENTS

| | | | |
|---|---|---|---|
| 4,542,062 | 9/1985 | Tokoda et al. | 428/694 |
| 4,603,091 | 7/1986 | Mukosa et al. | 428/611 |
| 4,610,911 | 9/1986 | Opfer et al. | 428/213 |
| 4,632,883 | 12/1986 | Howard et al. | 428/611 |
| 4,677,032 | 6/1987 | Robinson | 428/611 |
| 4,789,598 | 12/1988 | Howard et al. | 428/670 |

FOREIGN PATENT DOCUMENTS 59-217224 12/1984 Japan .
61-142524 6/1986 Japan .
62-141628 6/1987 Japan .

Primary Examiner—Paul J. Thibodeau
Attorney, Agent, or Firm—Lowe, Price, Leblanc & Becker

[57] ABSTRACT

A magnetic recording medium which comprises a non-magnetic substrate, a Cr undercoat layer formed on the substrate, and a quaternary alloy layer formed on the undercoat layer. The alloy layer consists of the following composition by atomic percent $1 \leq Cr \leq 18$ $2 \leq Ta \leq 9$ $73 \leq Co \leq 97$ $1 \leq Pt \leq 10$ provided that the atomic percent of Cr, Ta and Co is 100 in total and the atomic percent of Pt is based on the total of Cr, Ta and Co.

3 Claims, 7 Drawing Sheets

MAGNETIC RECORDING MEDIUM HAVING A MAGNETIC LAYER OF A QUATERNARY ALLOY

BACKGROUND OF THE INVENTION

1. Field of the Invention

This invention relates to magnetic recording mediums such as, for example, magnetic disks, magnetic tapes and the like.

2. Description of the Prior Art

In recent years, magnetic heads have been remarkably improved particularly with respect to the type of material therefor, coupled with an improvement in mechanical arrangement of the head that a degree of floating of the magnetic head becomes smaller than as having been experienced heretofore. These improvements enable one to record information in magnetic recording mediums having high coercivity. Accordingly, there is a demand for high density information recording using magnetic recording mediums with high coercivity.

In the sixth Convention of the Applied Magnetic Society on November, 1982 and also in the seventh Convention of the Applied Magnetic Society on November, 1983, binary and ternary alloys where Pt is added to Co alloys for use in magnetic recording mediums have been reported from Nippon Electric Co., Ltd.

Moreover, those mediums having a CoNiPt magnetic layer formed on a Cr layer have been stated in Japanese Laid-open Patent Application Nos. 62-141628 and 61-142524.

For high density information recording, the magnetic layer should be imparted with high coercivity. The maximum coercivity attained by the known magnetic recording mediums is usually in the range of from about 1000 to 1200 Oe. For instance, the medium described in the Japanese Laid-open Patent Application No. 62-141628 has a coercivity of about 1200 Oe and that of the Japanese Laid-open Patent Application No. 61-142524 has a coercivity of about 1000 Oe.

The magnetic recording mediums obtained by addition of Pt to Co alloys as described above cannot be imparted with sufficiently high coercivity unless Pt is added at least in amounts of approximately 15 atomic percent. In view of the expensiveness of Pt, the mediums are not considered as practical.

SUMMARY OF THE INVENTION

It is accordingly an object of the invention to provide a magnetic recording medium which overcomes the drawbacks of the prior art mediums and which has a significantly improved coercivity, thus being suitable for high density information recording.

It is another object of the invention to provide a magnetic recording medium which makes use of a quaternary alloy as a magnetic layer wherein expensive Pt is contained but is significantly reduced in amount.

The present invention provides a magnetic recording medium suitable for high density information recording, which comprises a non-magnetic substrate, a layer of Cr formed on the substrate and a layer of a CoCrTaPt quaternary alloy. The alloy consists essentially of the following composition by atomic percent $1 \leq Cr \leq 18$ $2 \leq Ta \leq 9$ $73 \leq Co \leq 97$ $1 \leq Pt \leq 10$ provided that the atomic percent of Cr, Ta and Co is 100 in total and the atomic percent of Pt is based on the total of Cr, Ta and Co.

DETAILED DESCRIPTION AND EMBODIMENTS OF THE INVENTION

Figure 1:
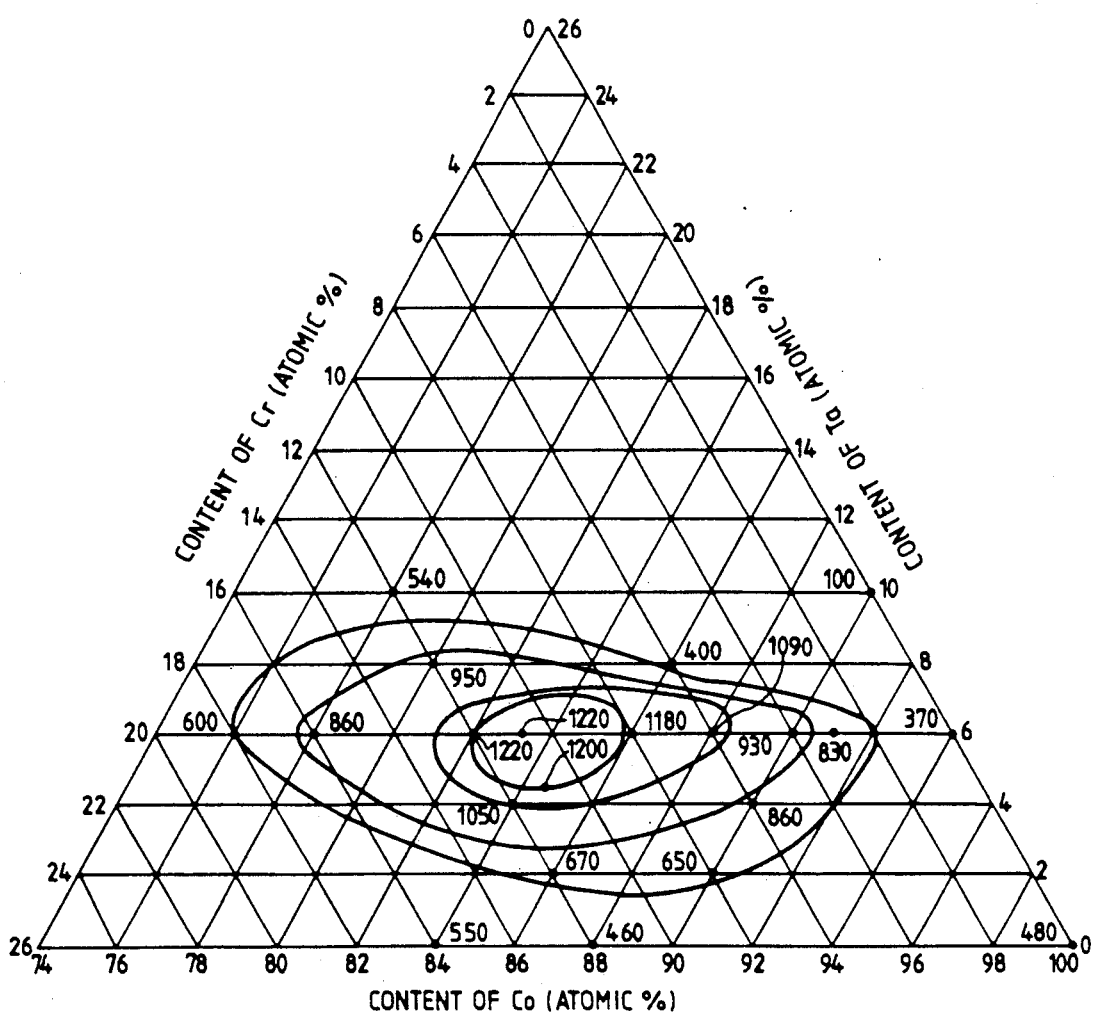
FIG. 1 is a triangular coordinate graph showing the relation between the coercivity, Hc, and the composition of CoCrTa alloy.

The present invention is characterized in that a magnetic layer of a CoCrTaPt alloy having a defined composition is formed on a non-magnetic substrate through a Cr undercoat layer. The alloy has a composition by atomic percent which consists essentially of $1 \leq Cr \leq 18$ $2 \leq Ta \leq 9$ $73 \leq Co \leq 97$ $1 \leq Pt \leq 10$ provided that the atomic percent of Cr, Ta and Co is 100 in total and the atomic percent of Pt is based on the total of Cr, Ta and Co.

In the practice of the invention, the magnetic recording mediums are designed to have high coercivity without a sacrifice of other magnetic characteristics in order to attain high density information recording. In addition, the medium should not be poor in economy. For this purpose, the CoCrTa alloy which exhibits a relatively high coercivity is used as a base alloy. It has been found that when Pt is added to the CoCrTa base alloy, the coercivity is remarkably improved. The present invention is accomplished based on the above finding.

The reason why the alloy composition is defined as above is described. First, the CoCrTa base alloy is described.

As stated above, CoCrTa alloys generally have high coercivity. This has been experimentally confirmed by a test wherein CoCrTa alloys having contents of Cr and Ta each in the range of from 0 to 20 atomic percent with the balance of Co. The coercivity of the CoCrTa alloy, which has a composition that $1 \leq Cr \leq 18$, $2 \leq Ta \leq 9$ and $73 \leq Co \leq 97$ provided that the total of $Cr + Ta + Co$ is 100, is higher than or substantially equal to those of Co, CoCr or CoTa alloys.

When Pt is added to this CoTaCr base alloy, the coercivity becomes maximum at about 6 atomic percent of Pt based on the base alloy, i.e. about 1700 Oe. Over 17 atomic percent, the coercivity does not become higher than that of the CoTaCr base alloy. From this, the content of Pt based on the CoTaCr alloy is in the range of from 1 to 17 atomic percent. However, in view of the economy and the coercivity, the content of Pt should be in the range of from 1 to 10 atomic percent based on the total of the CoTaCr alloy.

Moreover, magnetic characteristics including not only the coercivity, but also the saturation magnetization, the CoCrTaPt alloy should preferably have a composition which consists essentially of $8 \leq Cr \leq 15$, $3 \leq Ta \leq 7$, $1.7 \leq Pt \leq 7.7$ and the balance of Co in which the total content of Cr, Ta, Pt and Co is 100 atomic percent.

More preferably, higher coercive values are obtained when the CoCrTaPt alloy has a composition which consists essential of $8.7 \leq Cr \leq 13$, $3.5 \leq Ta \leq 6.5$, $3.5 \leq Pt \leq 6.5$ and the balance of Co in which the total content of Cr, Ta, Pt and Co is 100 atomic percent.

These compositions are particularly described in examples appearing hereinafter.

The alloy used in the present invention is formed on a substrate through a Cr undercoat layer in a thickness of from 50 to 10,000 angstroms.

The Cr undercoat layer is necessary and contributes to increase the coercivity when compared with the case where the alloy is directly formed on the substrate. The reason for this is considered as follows: the axis of easy magnetization of the film of the alloy is appropriately oriented when the alloy film is formed on the Cr layer. The thickness of the Cr layer is generally in the range of from 100 to 3000 angstroms.

The substrate may take any form such as a tape, disk, card or the like and may be made of plastic resins such as polyester resins, non-magnetic metals or alloys such as NiP alloys, ceramics or glass as is known in the art.

The fabrication of the magnetic medium is not critical. Any known techniques used for this purpose may be used including various sputtering techniques such as r.f. sputtering, D.C. magnetron sputtering, ion beam sputtering and the like. The Cr undercoat layer and the alloy layer can both be formed by these techniques.

The present invention is more particularly described by way of examples. Reference and comparative examples are also shown.

Reference

A 1000 angstrom thick Cr layer was formed on an NiP substrate by a DC magnetron sputtering method. Subsequently, a Co target on which Cr and Ta chips were placed was subjected to DC magnetron sputtering under conditions of a substrate temperature of 200° C. and an Ar gas pressure of 5 mTorr., to form on the Cr layer a CoCrTa layer having a thickness of 600 angstroms, thereby obtaining a magnetic disk. The above procedure was repeated to form CoCrTa layers having different compositions.

The resultant disks were subjected to measurement of coercivity.

The results are shown in FIG. 1. In the triangular coordinate of the figure, values indicated means those of coercivity at the respective compositions. The coercivity of the composition which is higher than those values of Co, CoCr and CoTa, i.e. 480 Oe, 550 Oe and 370 Oe, respectively, is determined as having compositions of $1 \leq Cr \leq 18$, $2 \leq Ta \leq 9$ and $73 \leq Co \leq 97$. These compositions are used as a base alloy to which Pt is to be added in the practice of the invention. This base alloy is designed so that the coercivity is compositionally increased in a condition where Pt is not added.

EXAMPLE 1

This example illustrates the influence of Pt on the coercivity.

A 1000 angstrom thick Cr layer was formed on an NiP substrate by a DC magnetron sputtering method. Subsequently, a $Co_{83}Cr_{11.6}Ta_{5.4}$ target on which a Pt chip was placed in different amounts was subjected to DC magnetron sputtering under conditions of a substrate temperature of 200° C. and an Ar gas pressure of 5 mTorr., to form on the Cr layer $Co_{83}Cr_{11.6}Ta_{5.4}$ layers having different amounts of Pt and having a thickness of 600 angstroms, thereby obtaining magnetic disks.

COMPARATIVE EXAMPLE 1

The general procedure of Example 1 was repeated except that a 600 angstrom thick $Co_{83}Cr_{11.6}Ta_{5.4}$ layer was formed on the Cr layer, thereby forming a magnetic disk.

The disks obtained in Example 1 and Comparative Example 1 were subjected to measurement of coercivity.

Figure 2:
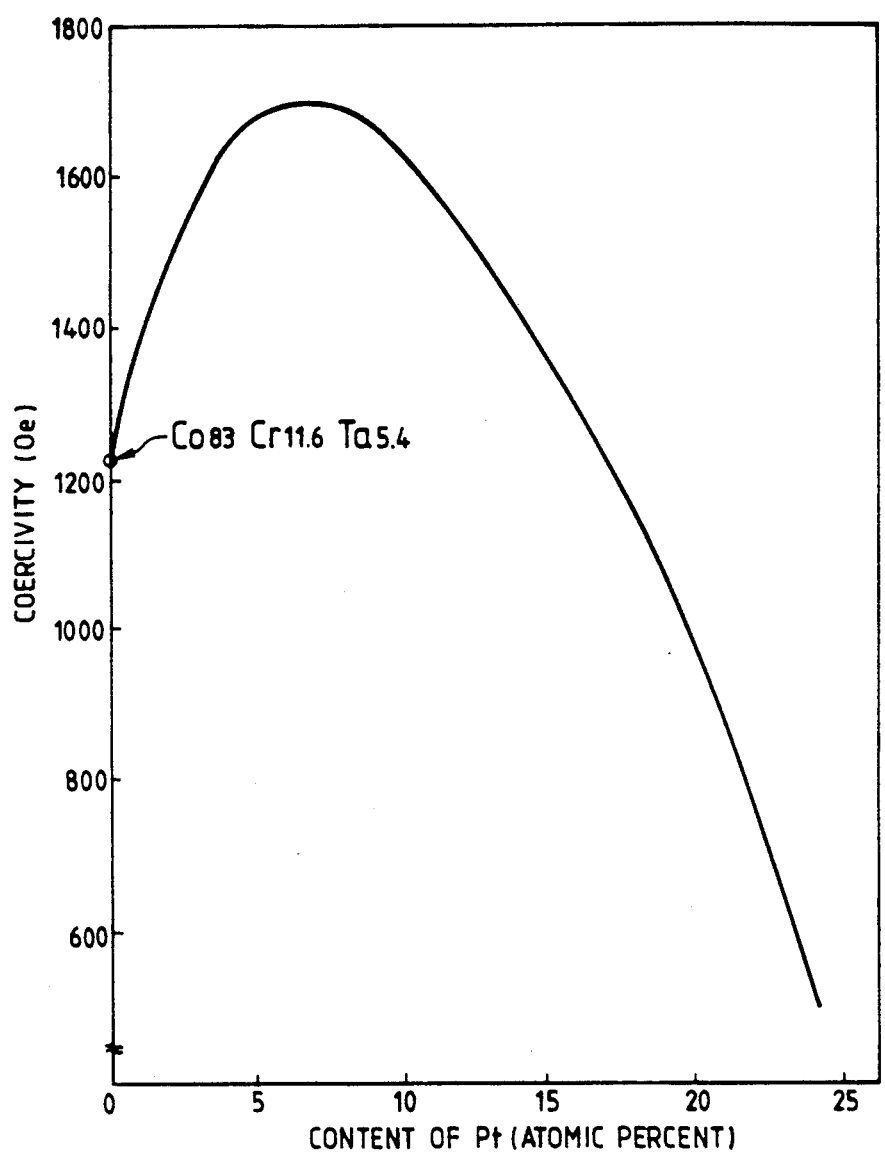
FIG. 2 is a graph showing the relation between the coercivity and the amount of Pt added to a CoCrTa alloy.

The results are shown in FIG. 2, revealing that when the Pt content is about 6 atomic percent, the coercivity reaches a maximum value of 1700 Oe. At the maximum level, the saturation magnetization, Ms, was about 600 emu/cc.

When the content of Pt exceeds 17 atomic percent, the coercivity becomes lower than that of the $Co_{83}Cr_{11.6}Ta_{5.4}$ alloy for comparison. Accordingly, the effect of the addition of Pt is obtained in the range of $1 \leq Pt \leq 17$ atomic percent. However, in view of the expensiveness of Pt, Pt should be as small as possible. In this sense, the content of Pt is determined to be in the range of from 1 to 10 atomic percent.

Figure 3:
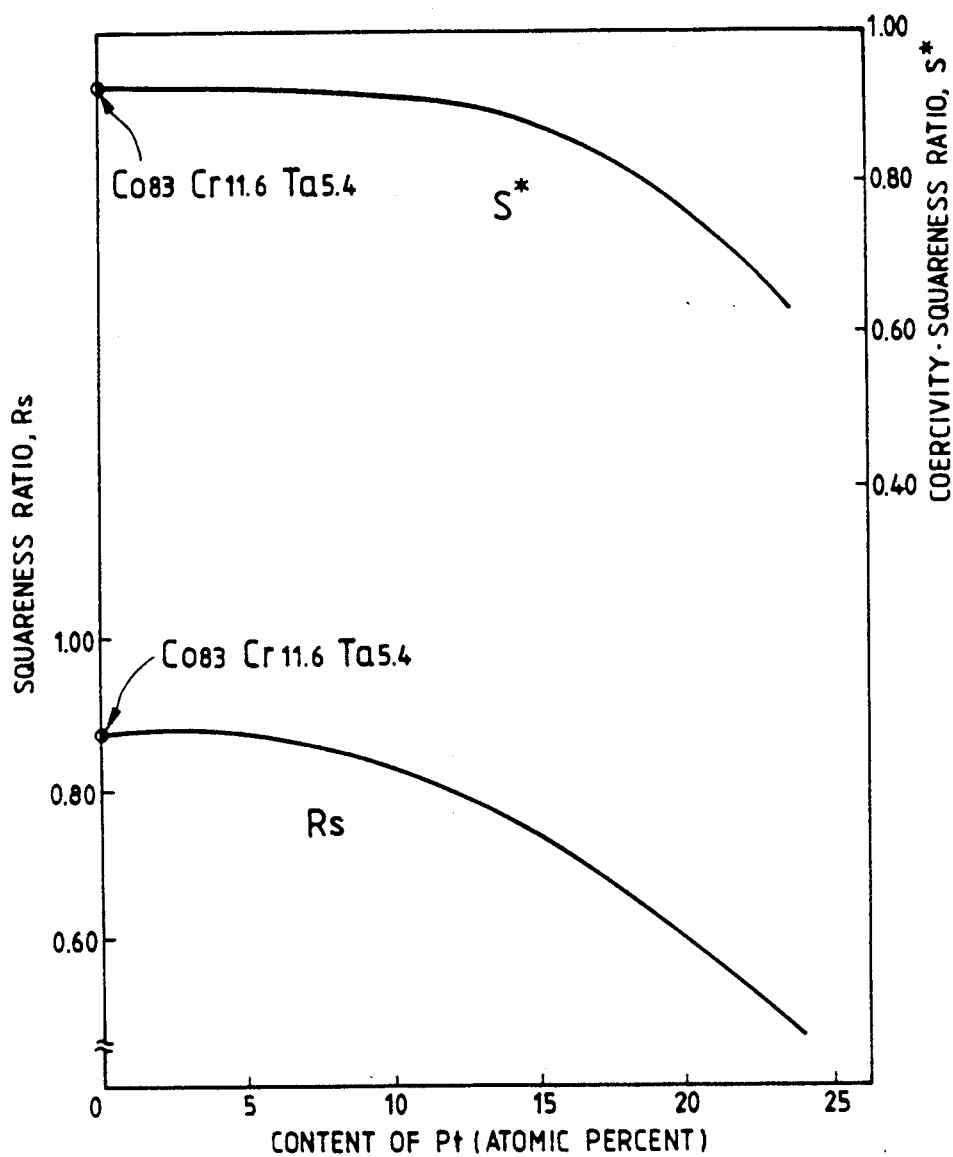
FIG. 3 is a graph showing the squareness ratio, Rs, and the coercivity . squareness ratio, S*, in relation to the variation in amount of Pt.

Moreover, the disks obtained in Example 1 and Comparative Example 1 were also subjected to measurements of squareness ratio, Rs, and coercivity . squareness ratio, S*. The results are shown in FIG. 3. From the figure, it will be seen that both characteristics exhibit only a slight variation up to about 10 atomic percent of Pt and are high enough to satisfy that $Rs > 0.8$ and $S^* > 0.9$.

EXAMPLE 2

This example illustrate influence of the contents of Co and Pt on magnetic characteristics.

The general procedure of Example 1 was repeated except that two types of alloys represented by the formulae, $Co_{81.4-z}Cr_{13.0}Ta_{5.6}Pt_z$ and $Co_{85.7-z}Cr_{8.7}Ta_{5.6}Pt_z$ were formed as a layer, thereby obtaining magnetic disks. In these disks, the contents of Co and Pt were changed in the respective types of alloys.

Figure 4:
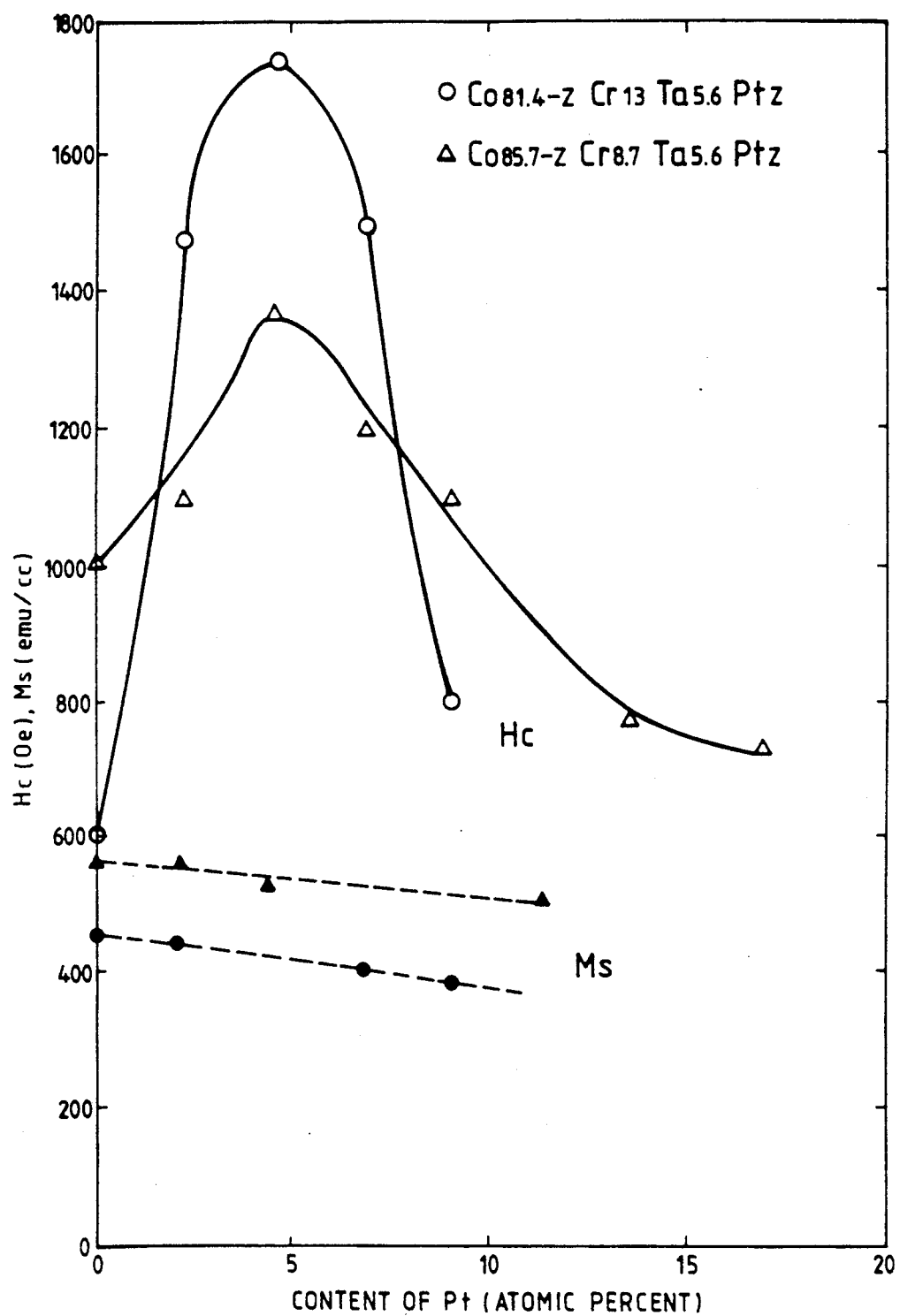
FIG. 4 is a graph showing the coercivity, Hc, and the saturation magnetization, Ms, in relation to the variation in amount of Pt for different alloy compositions.

The disks were subjected to measurements of Hc and Ms. The results are shown in FIG. 4 wherein the marks "○" and "Δ", respectively, indicate Hc values for the disk using the $Co_{81.4-z}Cr_{13.0}Ta_{5.6}Pt_z$ alloy and the disk using the $Co_{85.7-z}Cr_{8.7}Ta_{5.6}Pt_z$ alloy. Further, the marks "●" and "▲", respectively, indicate Ms values for the disks using the $Co_{81.4-z}Cr_{13.0}Ta_{5.6}Pt_z$ alloy and the disks using the $Co_{85.7-z}Cr_{8.7}Ta_{5.6}Pt_z$ alloy. From the figure, it will be seen that when $8.7 \leq Cr \leq 13$, $Ta=5.6$, $1.7 \leq Pt \leq 7.7$ and the balance of Co, the coercivity is higher than that of the CoCrTa alloy where the Pt content is zero, for each case. In addition, within the above ranges of the metal components, the Ms values are higher than 400 emu/cc.

EXAMPLE 3

This example illustrates the influence of Ta on magnetic characteristics.

The general procedure of Example 1 was repeated except that two types of alloys represented by the formulae.

$Co_{86.8-y}Cr_{8.7}Ta_yPt_{4.5}$ and $Co_{82.5-y}Cr_{13}Ta_yPt_{4.5}$ were formed as a magnetic layer, thereby obtaining magnetic disks. In the disks, the content of Co and Ta were varied.

Figure 5:
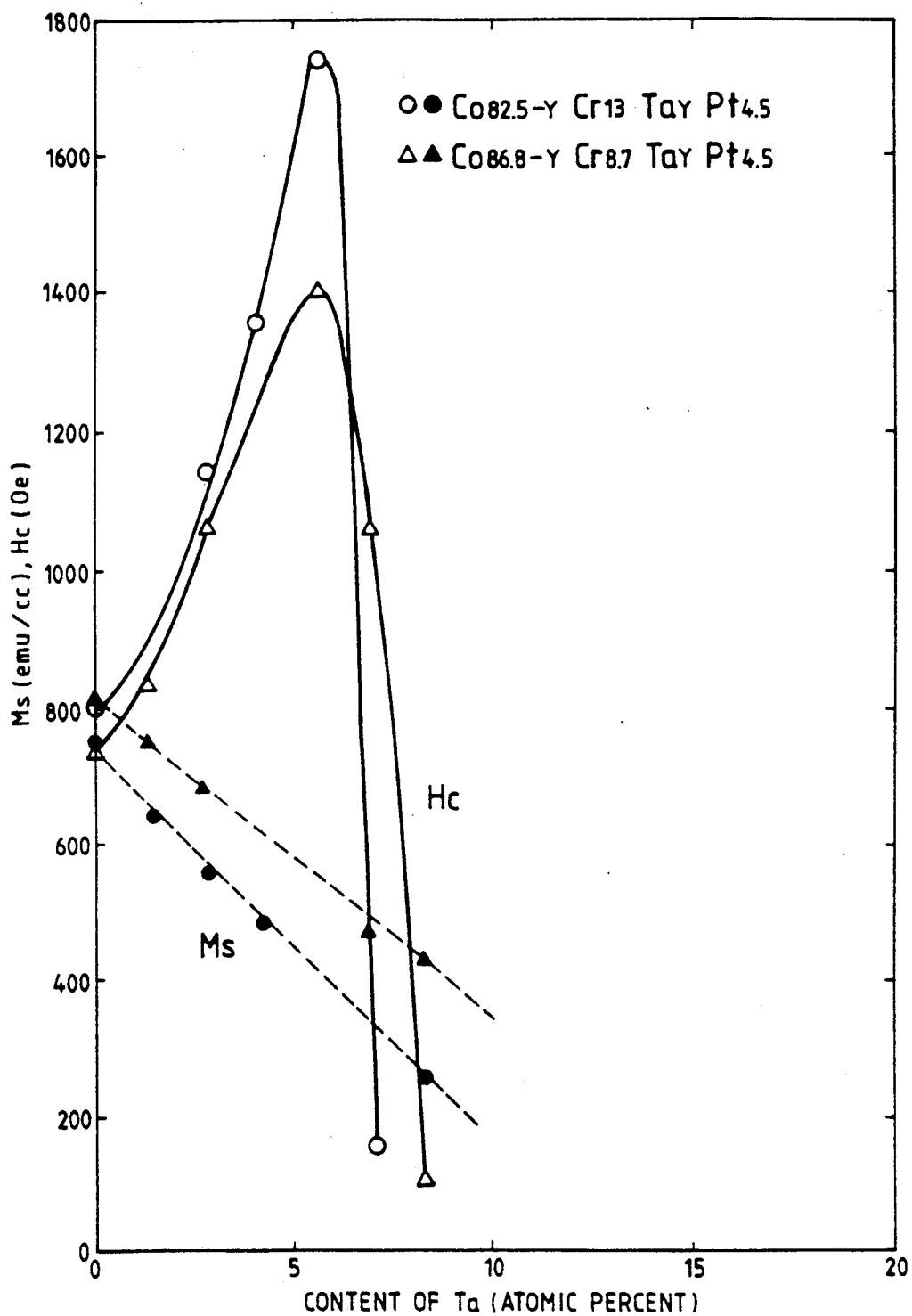
FIG. 5 is a graph showing the coercivity, Hc, and the saturation magnetization, Ms, in relation to the variation in amount of Ta for different alloy compositions.

The magnetic disks were subjected to measurements of Hc and Ms. The results are shown in FIG. 5 wherein the marks "O" and "Δ", respectively, indicate Hc values for the disks using the $Co_{82.5-y}Cr_{13}Ta_yPt_{4.5}$ alloy and and the disks using the $Co_{86.8-y}Cr_{8.7}Ta_yPt_{4.5}$ alloy. Further, the marks "●" and "▲", respectively, indicate Ms values for the disk using the $Co_{82.5-y}Cr_{13}Ta_yPt_{4.5}$ alloy and the disk using the $Co_{86.8-y}Cr_{8.7}Ta_yPt_{4.5}$ alloy. The results are shown in FIG. 5. From the figure, it will be seen that when Cr is in the range of from 8.7 to 13.0 and Ta is in the range of from 3 to 7, both atomic percent with Pt=4.5 and the balance of Co, the coercivity is higher than that of a disk using the CoCrTa alloy layer.

EXAMPLE 4

This example illustrates the influence of Cr on magnetic characteristics.

The general procedure of Example 1 was repeated except that three types of alloys represented by the formulae, (a) $Co_{88.7-x}Cr_xTa_{5.4}Pt_{5.9}$, (b) $Co_{92.5-x}Cr_xTa_{2.7}Pt_{4.8}$ and (c) $Co_{84.4-x}Cr_xTa_{10.8}Pt_{4.8}$ were formed as a magnetic layer, thereby obtaining magnetic disks. In the disks, the contents of Co and Cr were varied for different contents of Ta and Pt.

Figure 6:
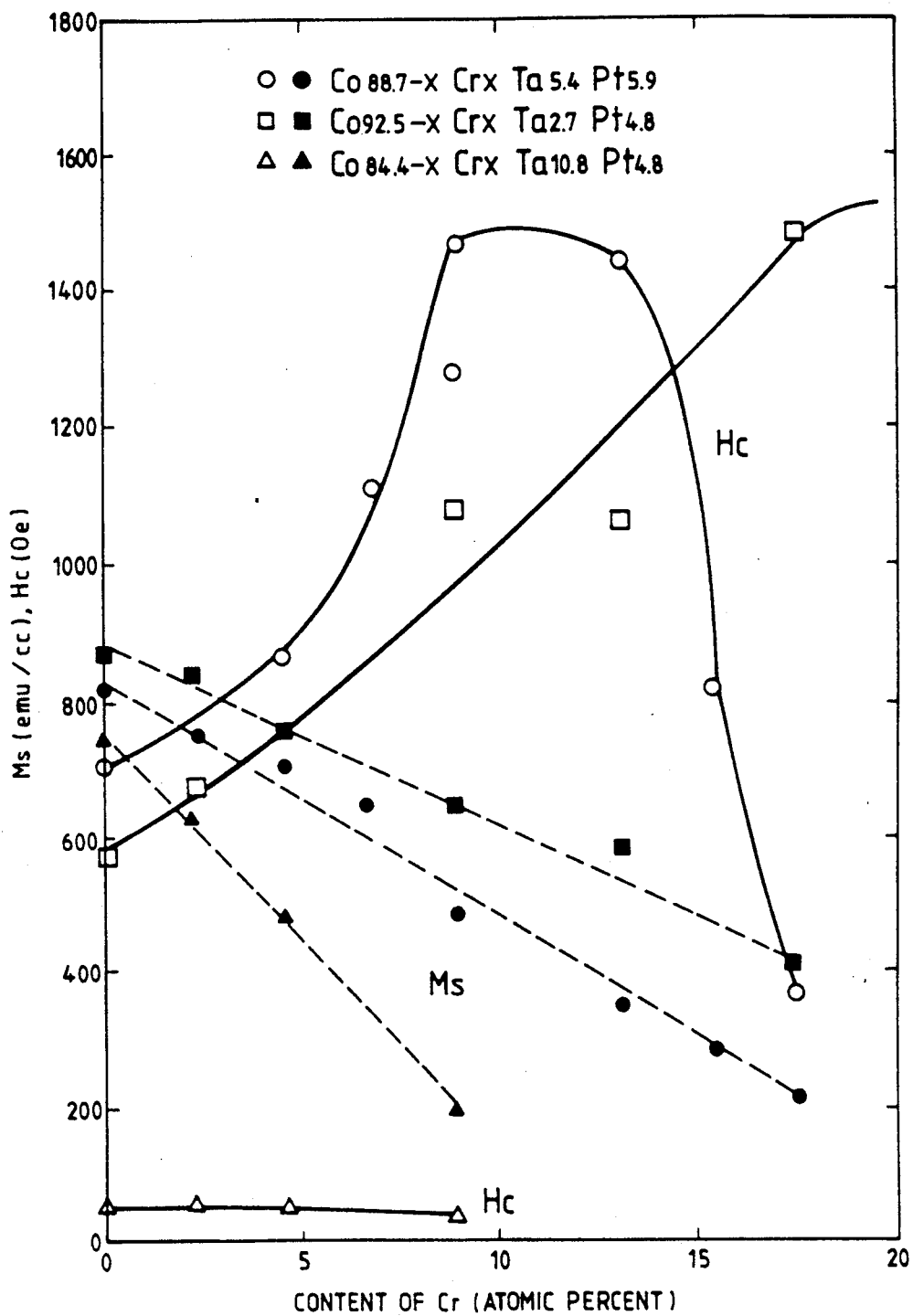
FIG. 6 is a graph showing the coercivity, Hc, and the saturation magnetization, Ms, in relation to the variation in amount of Cr for different alloy compositions.

The disks were subjected to measurements of magnetic characteristics. The results are shown in FIG. 6 in which the marks "O", "□" and "Δ", are, respectively, Hc values for the alloys (a), (b) and (c) and the marks "●", "■" and "▲" are, respectively, Ms values for the alloys (a), (b) and (c).

From the figure, it will be seen that when the Ta content is 10.8 atomic percent, the Hc value is very low. When the Ta content is 2.7 atomic percent, the Cr content of 15 atomic percent or over may be necessary. The Ta content is preferably from 3 to 7 atomic percent. With regard to the Cr content, the coercivity becomes maximum when the Cr content is 11 atomic percent for the alloy (a) and when the Cr content is about 18 atomic percent for the alloy (b). However, over 18 atomic percent, the saturation magnetization Ms becomes low. Accordingly, the Cr content is generally in the range of from 1 to 18 atomic percent. In order to obtain a higher coercive value, Hc, the Cr content is from 8 to 15 as will become apparent from the figure.

In view of the results of Examples 1, 2 and 4, a preferable alloy composition should consist of $8 \leq Cr \leq 15$, $3 \leq Ta \leq 7$, $1.7 \leq Pt \leq 7.7$ and the balance of Co. Within the ranges, high magnetic characteristics including Hc and Ms are obtained. Gathering the results of Examples a to 4, the alloy composition should more preferably consist of $8.7 \leq Cr \leq 13$, $3.5 \leq Ta \leq 6.5$, $3.5 \leq Pt \leq 6.5$ and the balance of Co.

COMPARATIVE EXAMPLE 2

This example illustrates the importance of a Cr undercoat layer.

The general procedure of Example 1 was repeated except that the Cr undercoat layer was not formed but a $Co_{76.6}Cr_{11.6}Ta_{5.4}Pt_{6.3}$ layer was formed directly on the NiP substrate. The resultant disk was subjected to measurement of magnetic characteristics.

The results are summarized below.

| Saturation Magnetization Ms (emu/cc) | Residual Magnetization Mr (emu/cc) | Squareness Ratio Rs | Coercivity Hc (Oe) | Squareness Ratio · Coercivity |
| --- | --- | --- | --- | --- |
| 637 | 338 | 0.53 | 320 | 0.81 |

These results are significantly poorer that those of Example 1 particularly with respect to the coercivity.

COMPARATIVE EXAMPLE 3

The general procedure of Example 1 was repeated except that a 750 angstrom thick CoNiPt layer was formed instead of the CoCrTaPt layer wherein the sputtering was effected using appropriate amounts of a Pt chip on a $Co_{84}Ni_{16}$ target, thereby obtaining magnetic disks having magnetic layers having different amounts of Pt. The disks were subjected to measurement of coercivity.

Figure 7:
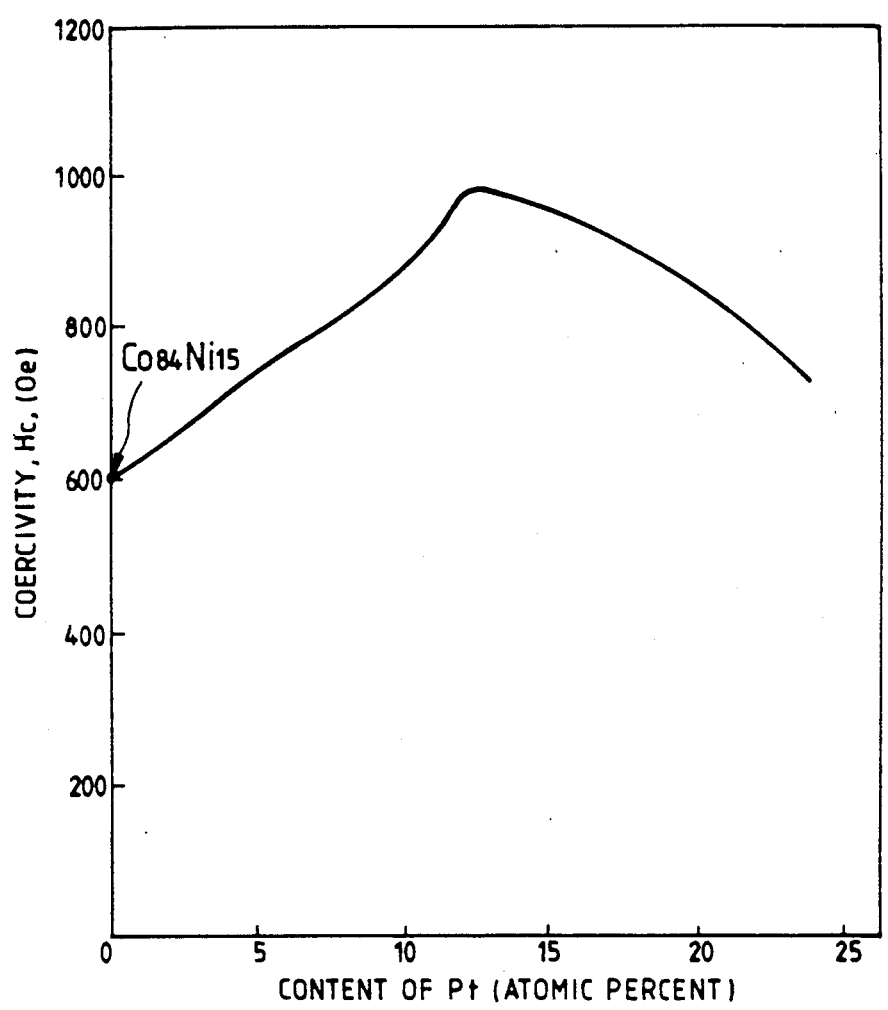
FIG. 7 is a graph showing the relation between the coercivity and the amount of Pt in a CrNi alloy for comparison.

The results are shown in FIG. 7, revealing that the coercivity is maximized at about 13 atomic percent of Pt with a value of 1000 Oe. This value is far lower than those values obtained in examples of the invention.

What is claimed is:

1. A magnetic recording medium suitable for high density recording, which comprises a non-magnetic substrate, a layer of Cr formed on the substrate and a layer of a CoCrTaPt quaternary alloy, said alloy consisting essentially of the following composition by atomic percent $1 \leq Cr \leq 18$ $2 \leq Ta \leq 9$ $73 \leq Co \leq 97$ $1 \leq Pt \leq 10$ provided that the atomic percent of Cr, Ta and Co is 100 in total and the atomic percent of Pt is based on the total of Cr, Ta and Co.

2. A magnetic recording medium according to claim 1, wherein said alloy consists essentially of $8 \leq Cr \leq 15$, $3 \leq Ta \leq 7$, $1.7 \leq Pt \leq 7.7$ and the balance of Co in which the total content of Cr, Ta, Pt and Co is 100 atomic percent.

3. A magnetic recording medium according to claim 1, wherein said alloy consists essentially of $8.7 \leq Cr \leq 13$, $3.5 \leq Ta \leq 6.5$, $3.5 \leq Pt \leq 6.5$ and the balance of Co in which the total content of Cr, Ta, Pt and Co is 100 atomic percent.

* * * * *